Oct. 22, 1935.  E. B. TOLMAN, JR  2,018,156
ASH MIXING AND MOISTENING DEVICE
Filed Sept. 4, 1934   2 Sheets-Sheet 2
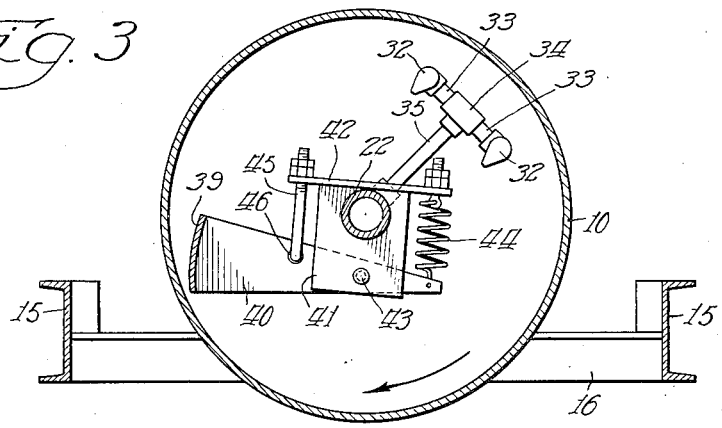
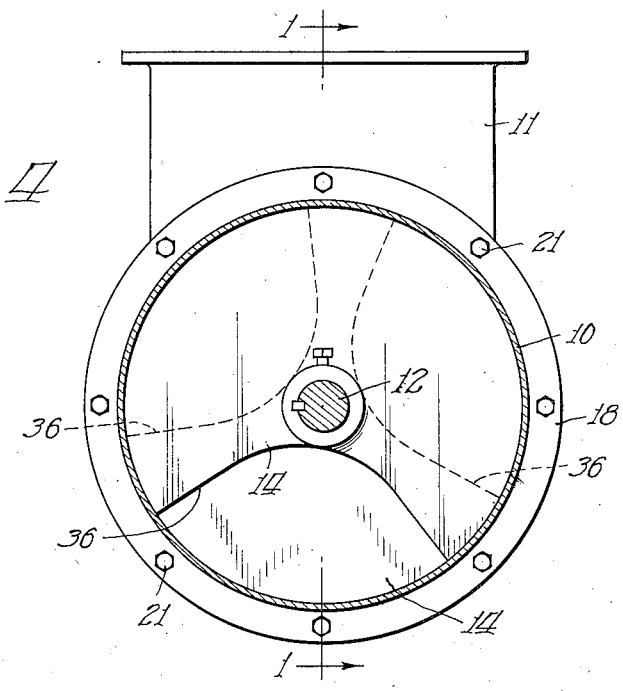
Witness:
V. Siljander
Inventor
Edgar B. Tolman, Jr.
By
Hill & Hill
Attys.

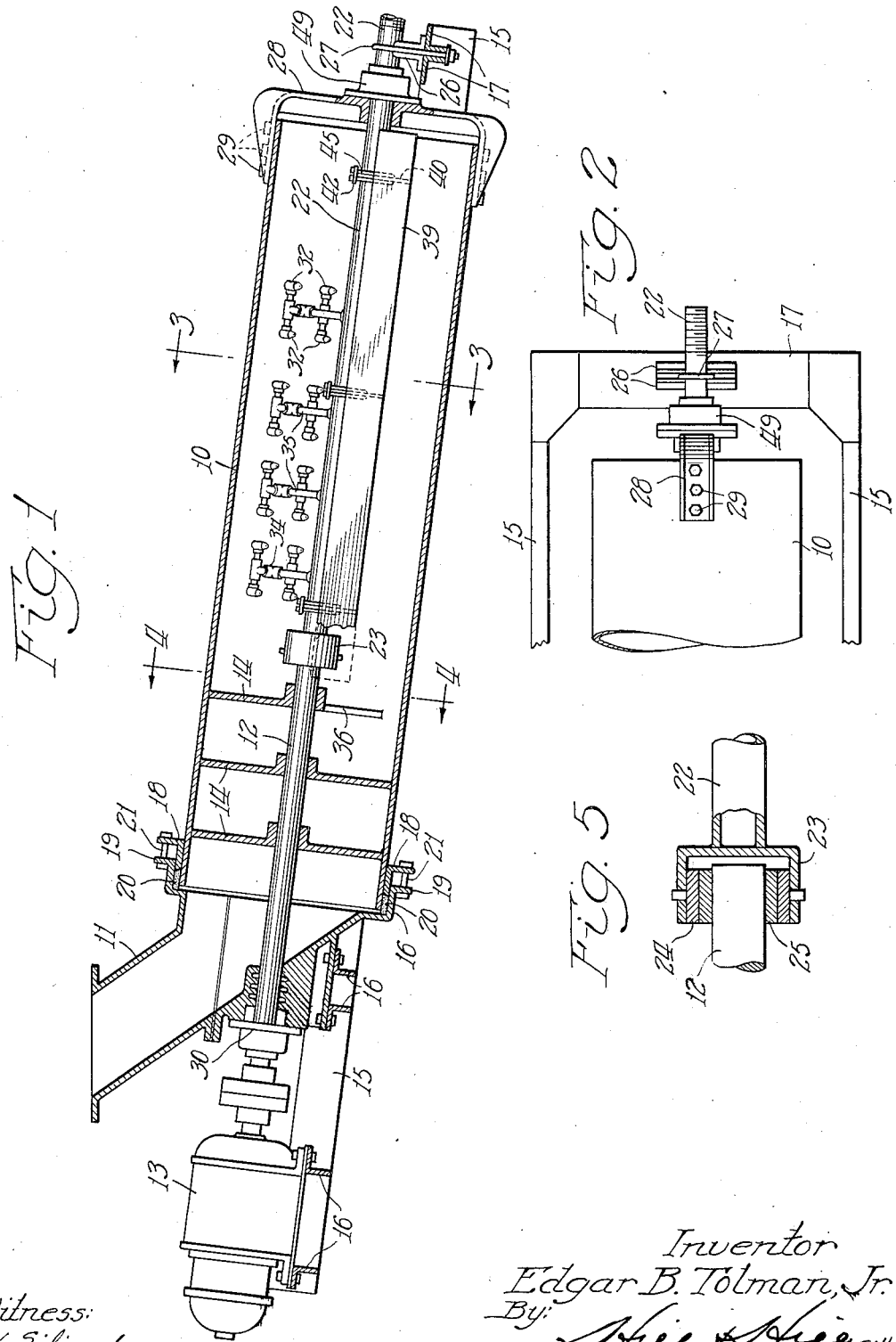

Patented Oct. 22, 1935

2,018,156

UNITED STATES PATENT OFFICE 2,018,156

ASH MIXING AND MOISTENING DEVICE

Edgar B. Tolman, Jr., Chicago, Ill.

Application September 4, 1934, Serial No. 742,697

1 Claim. (Cl. 259—9)

The invention relates to mixing apparatus and more particularly it relates to apparatus for adding moisture to fine dusty materials such as soot, fly ash and the like as a preliminary to its discharge from a storage bin into the open. The invention has an important adaptation in connection with pulverized fuel fired furnaces which tend to accumulate large quantities of fine dusty material in various parts of the furnace and which is usually removed and collected in a storage bin by means of pneumatic or other type of conveying equipment preventing its dissemination throughout the atmosphere. It has been found very difficult to withdraw material of this character from a storage bin and discharge it into a vehicle such as a truck or railroad car without creating an objectionable amount of dust. For example, if the material is stored in a bin in a wet state it packs and its removal is only accomplished after considerable labor, difficulty and expense. It is desirable, therefore, to store this material in a dry condition but its diffusive qualities makes it necessary to add sufficient water upon its discharge from the storage bin in order that it can be handled without the dust creating a nuisance. The self-diffusing qualities of the material are such that the moisture must be freely disseminated therethrough and it is desirable that a proper amount of water be used to avoid a muddy, sloppy condition of the material.

It is an object of the invention to provide improved apparatus adapted to add water to a mass of diffusive dusty material in a manner such that the mass is uniformly dampened sufficiently that it can be handled without diffusing itself throughout the atmosphere in the form of dust.

It is another object of the invention to provide improved means for delivering fine dusty materials into a mixing drum whereby dust from such material is prevented from diffusion through the atmosphere.

A further object of the invention is the provision of improved mechanism adapted to receive diffusive dusty materials from a storage bin or the like and to discharge it into the open in a uniformly dampened state, in combination with improved means for preventing the dampened material from adhering to said mechanism.

A further object of the invention is the provision of mixing apparatus which is economical in the use of power, operable with a minimum amount of wear, durable, simple in operation and generally satisfactory for its intended purpose.

Many other objects and advantages of the construction herein shown and described will be obvious to those skilled in the art from the disclosure herein given. To this end my invention consists in the novel construction, arrangement and combination of parts herein shown and described and more particularly pointed out in the claim.

In the drawings where like reference characters indicate like or corresponding parts:

Fig. 1 is a longitudinal vertical section through an ash mixing and moistening device embodying the principles of the invention;

Fig. 2 is a plan view of a fragmentary portion of a frame providing a support for the apparatus;

Fig. 3 is a view along the line 3—3 of Fig. 1;

Fig. 4 is a view along the line 4—4 of Fig. 1; and

Fig. 5 is a view showing the mounting of one end of the stationary pipe on the rotary shaft.

Referring now more particularly to the drawings, the numeral 10 designates a rotatable drum inclined to the horizontal and carried by a supporting frame 15. A stationary member 11, arranged to discharge into the upper end of the drum, is carried by transversely extending supporting angles 16 connected at their ends with the frame 15. The open end of the member 11 is adapted for connection with an ash storage bin by means of a closed conduit, not shown, preferably in such a manner that material may flow by gravity into the member 11 and thence into the upper end of the drum without any of the ash escaping into the atmosphere.

A dust tight seal is provided between the member 11 and the drum 10 consisting of a circular flange 19 on the lower end of the member within which the upper end of the drum is rotatable, and an angle member 18 extending around the drum and fastened to the flange 19 by means of bolts 21. The longitudinally projecting leg of the angle member 18 is positioned within the flange 19 and is adjusted by means of the bolts 21 to bring it into engagement with a ring of packing or stuffing material 20 in a manner to provide a dust tight joint.

A motor 13, supported by transversely extending angles 16, is operatively connected with the drum 10 by a shaft 12 which projects through the inlet member 11 and terminates some distance within the drum. A plurality of baffle plates or members 14 are fastened to the shaft 12 by keys or the like and have their outer edges welded or otherwise suitably fastened to the inner periphery of the drum 10.

The lower open end of the drum 10 is supported by a stationary pipe 22, in longitudinal alignment with the shaft 12, the longitudinal center lines of the shaft and of the pipe preferably coinciding with the longitudinal axis of the drum. The pipe 22 is carried by a pair of angles 26 resting upon transversely extending angles 17, the pipe being clamped to the angles by a U-bolt 27. A yoke member 28, having its ends fastened to the drum 10 by bolts or rivets 29, is journalled upon the pipe 22 adjacent the point of support of the latter. The lower end of the pipe 22 is threaded and adapted thereby for connection with a pipe or conduit, not shown, leading to a source of water supply. A bearing member 49, rotatable with the yoke 28, and a bearing member 30 fastened to the inlet member 11, each carrying roller bearings, not shown, adapt the drum 10 to be rotated with a minimum of frictional resistance.

The upper end of the pipe 22 is closed and terminates adjacent the lower end of the rotatable shaft 12. A cylindrical member 23, mounted on the pipe 22 encloses the adjacent end of the shaft and has a collar 24 fastened to its inner periphery. A ring 25, mounted on the lower end of the shaft 12, co-operates with the collar 24 to provide a bearing for the upper end of the pipe 22.

The portion of the drum 10 below the baffle plates 14 provides an ash conditioning chamber, and the upper end of the drum containing the baffle plates 14 provides a plurality of connected chambers forming a tortuous path limiting and retarding the flow of the contents into the conditioning chamber. Each of the baffle plates 14 are provided with an aperture 36 of substantial size and out of register with the apertures of the adjacent plates. Obviously as the drum 10 rotates, a limited amount of material will flow by gravity successively through the apertures 36, such flow occurring only when the aperture is near the bottom of the drum. The tortuous path provided by the non-registering apertures 36 limits the amount of material carried from the inlet member into the mixing chamber, to a quantity which will not overload the conditioning chamber.

Water is delivered into the mixing chamber by a plurality of nozzles 32 connected with the pipe 22 by lateral pipes 35. The nozzles 32 are provided in groups, arranged in spaced-apart relation along the pipe 22, the nozzles of each group being connected with the lateral pipes 35 by nipples 33 and T's 34. The nozzles are so spaced and arranged as to direct sprays of water downwardly onto the material in sufficient quantities to uniformly dampen the same.

The dampened material tends to adhere to the drum and necessitates the provision of some means for its removal. For this purpose I have provided a non-rotatable scraper bar 39 positioned in close proximity to the ascending side wall of the drum. The bar 39 is supported on the pipe 22 by a plurality of arms 40, each connected by a pivot 43 with a pair of spaced apart plates 41 rigidly fastened to the pipe 22.

A bar 42, fixed relative to the plates 41 and the pipe 22, has its ends projecting beyond the plates to provide mountings for a bolt 45 and an extensile spring 44. The spring 44 is connected with the free end of the arm 40 and the bolt 45 projects through an aperture 46 provided in the arm between the pivot 43 and the scraper bar 39. The springs 44 and the bolts 45 cooperate to normally hold the scraper bar 39 in the position shown. In the event extraordinary pressure is exerted on the scraper bar 39 by klinkers or the like wedging between the bar and the drum, the springs 44 will yield to permit rotation of the scraper bar about the pivots 43 accompanied by corresponding upward movement of the bolts 45 and upon release of such pressure, the springs will return the scraper bar to its normal operative position.

Thus it will be seen that I have provided improved mixing and moistening apparatus adapted to uniformly dampen highly diffusive dusty materials without possibility of dust escaping therefrom into the atmosphere.

Having thus described my invention, it is obvious that various immaterial modifications may be made in the same without departing from the spirit of my invention; hence I do wish to be understood as limiting myself to the exact form, construction, arrangement and combination of parts herein and described or uses mentioned.

What I claim as new and desire to secure by Letters Patent is:

In apparatus of the kind described, a rotatably supported inclined drum open at its upper end, a stationary inlet member adapted to deliver material into the upper end of the drum, means providing a dust tight seal between said stationary member and drum, a baffle device in the upper end of the drum adapted to retard the flow of material, a driving shaft positioned in and projecting from the upper end of the drum, a stationary tube positioned in the lower end of the drum and adapted for connection with a water supply, means adapted to discharge water laterally from the tube into the drum, said shaft and tube being coincident with the longitudinal axis of the drum, a stationary scraper bar operatively related to the ascending side of the drum, means carried by the tube providing supports on which said bar is pivotally mounted, and resilient means carried by said supporting means adapted to normally maintain the scraper bar in said operative relation to the drum, said resilient means adapted to yield to permit rotation of the bar away from the drum when excessive pressure is applied to the bar.

EDGAR B. TOLMAN, Jr.